US012620618B2

(12) United States Patent
Liu et al.

(10) Patent No.: US 12,620,618 B2
(45) Date of Patent: May 5, 2026

(54) FUNCTIONALIZED SEPARATOR AND METHOD FOR PREPARING THE SAME, LITHIUM METAL BATTERY AND DEVICE COMPRISING THE SAME

(71) Applicant: CONTEMPORARY AMPEREX TECHNOLOGY (HONG KONG) LIMITED, Hong Kong (CN)

(72) Inventors: Chengyong Liu, Ningde (CN); Yongsheng Guo, Ningde (CN); Quan Fan, Ningde (CN); Tao Zhang, Ningde (CN); Chengdu Liang, Ningde (CN); Jun Yang, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 634 days.

(21) Appl. No.: 17/556,987

(22) Filed: Dec. 20, 2021

(65) Prior Publication Data

US 2022/0115689 A1 Apr. 14, 2022

Related U.S. Application Data

(63) Continuation of application No. PCT/CN2020/101668, filed on Jul. 13, 2020.

(30) Foreign Application Priority Data

Jul. 26, 2019 (CN) ........................ 201910682442.1

(51) Int. Cl.
*H01M 10/0525* (2010.01)
*H01M 4/134* (2010.01)
(Continued)

(52) U.S. Cl.
CPC ..... *H01M 10/0525* (2013.01); *H01M 50/431* (2021.01); *H01M 50/449* (2021.01);
(Continued)

(58) Field of Classification Search
CPC ..................................................... H01M 4/134
See application file for complete search history.

(56) References Cited

U.S. PATENT DOCUMENTS

| | | | | |
|---|---|---|---|---|
| 9,705,167 B2 | 7/2017 | Khiterer et al. | | |
| 2003/0124429 A1* | 7/2003 | Okada ................ | H01M 50/491 429/251 | |

(Continued)

FOREIGN PATENT DOCUMENTS

| | | | |
|---|---|---|---|
| CN | 1334969 A | 2/2002 | |
| CN | 104868084 A | 8/2015 | |

(Continued)

OTHER PUBLICATIONS

The extended European search report for EP Application No. 20846846.2, dated Jun. 13, 2022, 8 pages.

(Continued)

*Primary Examiner* — Matthew W Van Oudenaren
(74) *Attorney, Agent, or Firm* — East IP P.C.

(57) ABSTRACT

The present application discloses a functionalized separator, a method for preparing the same, a lithium metal battery, and a device comprising the lithium metal battery. The functionalized separator comprises a porous substrate and a functional film layer provided on at least one side of the porous substrate, wherein the functional film layer comprises inorganic particles which are able to reversibly react with metal lithium to form a lithium alloy.

9 Claims, 3 Drawing Sheets

(51) Int. Cl.

| | |
|---|---|
| ***H01M 50/431*** | (2021.01) |
| ***H01M 50/434*** | (2021.01) |
| ***H01M 50/443*** | (2021.01) |
| ***H01M 50/446*** | (2021.01) |
| ***H01M 50/449*** | (2021.01) |
| ***H01M 50/451*** | (2021.01) |
| ***H01M 50/454*** | (2021.01) |
| ***H01M 50/489*** | (2021.01) |
| ***H01M 50/491*** | (2021.01) |
| ***H01M 50/494*** | (2021.01) |
| ***H01M 50/497*** | (2021.01) |

(52) U.S. Cl.

CPC .......... *H01M 50/491* (2021.01); *H01M 4/134* (2013.01); *H01M 50/434* (2021.01); *H01M 50/443* (2021.01); *H01M 50/446* (2021.01); *H01M 50/451* (2021.01); *H01M 50/454* (2021.01); *H01M 50/489* (2021.01); *H01M 50/494* (2021.01); *H01M 50/497* (2021.01)

(56) References Cited

U.S. PATENT DOCUMENTS

| | | | | |
|---|---|---|---|---|
| 2008/0118834 | A1* | 5/2008 | Yew | C01G 39/006<br>429/231.95 |
| 2012/0208070 | A1 | 8/2012 | Nakashima et al. | |
| 2014/0272523 | A1 | 9/2014 | Otsuka et al. | |
| 2014/0272595 | A1 | 9/2014 | Cristadoro et al. | |
| 2017/0117542 | A1* | 4/2017 | Park | H01M 4/386 |
| 2017/0301920 | A1* | 10/2017 | Liu | C08J 5/2231 |
| 2017/0346062 | A1* | 11/2017 | Wong | H01M 50/417 |

FOREIGN PATENT DOCUMENTS

| | | | |
|---|---|---|---|
| CN | 104979514 | A | 10/2015 |
| CN | 107305950 | A | 10/2017 |
| CN | 107919491 | A | 4/2018 |
| CN | 105280886 | B | 5/2018 |
| CN | 108448031 | A | 8/2018 |
| CN | 109411681 | A | 3/2019 |
| CN | 109713204 | A | 5/2019 |
| CN | 109860488 | A | 6/2019 |
| CN | 109980164 | A | 7/2019 |
| CN | 110364662 | A | 10/2019 |
| CN | 110880575 | A | 3/2020 |
| CN | 111244373 | A | 6/2020 |
| EP | 3136475 | A1 | 3/2017 |
| KR | 1020140073739 | A | 6/2014 |
| KR | 1020150050467 | * | 5/2015 |
| KR | 1020180024532 | A | 3/2018 |
| KR | 20180124724 | A | 11/2018 |
| KR | 20190083916 | A | 7/2019 |
| KR | 1020190083916 | * | 7/2019 |
| WO | 2015027919 | A1 | 3/2015 |

OTHER PUBLICATIONS

The International search report for PCT Application No. PCT/CN2020/101668, dated Oct. 16, 2020, 14 pages.

The First Office Action for China Application No. 201910682442.1, dated May 28, 2021, 12 pages.

The Second Office Action for China Application No. 201910682442.1, dated Aug. 24, 2021, 10 pages.

The First Office Action for European Application No. 20846846.2, dated Feb. 16, 2023, 7 pages.

* cited by examiner

FUNCTIONALIZED SEPARATOR AND METHOD FOR PREPARING THE SAME, LITHIUM METAL BATTERY AND DEVICE COMPRISING THE SAME

CROSS-REFERENCE TO RELATED APPLICATIONS

This application is a continuation of International Application No. PCT/CN2020/101668, filed on Jul. 3, 2020, which claims priority to Chinese Patent Application No. 201910682442.1 entitled "Functionalized Separator and Lithium Metal Battery" and filed on Jul. 26, 2019, both of which are incorporated herein by reference in their entireties.

TECHNICAL FIELD

The application belongs to the technical field of energy storage devices, and specifically relates to a functionalized separator and a lithium metal battery.

BACKGROUND

Metal lithium has a theoretical specific capacity (3860 mAh/g) that is much higher than that of graphite negative materials that are widely used currently (372 mAh/g), and the metallic lithium has an electrode potential as low as −3.04V (vs. $H_2/H^+$). Therefore, lithium metal batteries using metal lithium as the negative electrode material are expected to become next generation of storage devices having high energy density. However, lithium metal batteries are prone to produce lithium dendrites during charging. This will reduce the coulombic efficiency and cycle life of the battery. Moreover, this will cause internal short circuits between the positive and negative electrodes due to the penetration of lithium dendrites through the separator, which may result in safety accidents such as the explosive or catching fire of the battery. Lithium dendrites seriously hinder the commercial application of lithium metal batteries.

SUMMARY

A first aspect of the present application provides a functionalized separator, comprising a porous substrate and a functional film layer provided on at least one surface of the porous substrate, wherein, the functional film layer comprises inorganic particles which are able to reversibly react with metal lithium to form a lithium alloy.

The functionalized separator provided in the present application comprises a functional film layer, wherein the functional film layer comprises inorganic particles which are able to reversibly react with metal lithium to form a lithium alloy. When the functionalized separator is used in a lithium metal battery and the functional film layer contacts with lithium metal, the inorganic particles and the metal lithium, under the action of the electrolyte solution, will react reversibly to form a lithium alloy in situ; accordingly, the lithium composition on the surface of the metal lithium electrode changes. The forming of lithium alloys may adjust and control the deposition/dissolution behavior of lithium ions, may effectively inhibit the growth of dendrites on lithium metal electrodes, and may be helpful to improve the reversibility of the deposition/dissolution of lithium ions in lithium metal electrodes. Therefore, by using the functionalized separator of the present application, the initial coulombic efficiency, cycle performance, and safety performance of lithium metal batteries can be improved.

In any embodiment, the inorganic particles has a volume average particle size $D_v50$ of from 10 nm to 20 μm, optionally from 50 nm to 10 μm, and further optionally from 200 nm to 2 μm. Under the condition that the inorganic particles have appropriate particle size, the capacity and cycle performance of the battery can be improved.

In any embodiment, the inorganic particles are one or more selected from silicon, silicon oxide compound $SiO_a$ wherein $0<a<2$, magnesium, aluminum, zinc, indium, antimony, silver, gold, germanium, and tin.

In any embodiment, at least part of the surface of the inorganic particles is coated with a polymer coating layer, wherein the polymer coating layer comprises a group that is reversibly bonded with lithium ions.

In the present application, at least part of the surface of the inorganic particles may be coated with a polymer coating layer, wherein the polymer coating layer comprises a group that is reversibly bonded with lithium ions. The group reversibly bonds with lithium ions by reacting with the lithium alloy, so that the binding tightness between the coating layer and the inorganic particles is improved. Thus, the coating layer may better inhibit the volume change of the lithium alloy during charging and discharging of the battery. Moreover, the group in the coating layer may form chemical bond in suit with lithium ions, wherein the chemical bond may serve as a channel for transmitting lithium ions, so as to promote the transmitting of lithium ions and thus improve the dynamic performance of the metal lithium electrode. Therefore, the functionalized separator can further improve the initial coulombic efficiency, cycle performance and safety performance of lithium metal batteries.

Optionally, the group that is reversibly bonded with lithium ions comprises one or more of an acid radical group, an amino group, an imino group, a sulfhydryl group, and a polysulfide group ($—S_b—$, $b\geq2$). Further optionally, the acid radical group comprises one or more of carboxylic acid group, sulfonic acid group, sulfinic acid group, and phosphoric acid group.

In any embodiment, the coating layer comprises polyolefin acid containing the acid radical group. Optionally, the polyolefin acid comprises one or more of polyacrylic acid and polystyrene sulfonic acid.

Under the condition that the surface of the inorganic particles is coated with a suitable coating layer, the cycle performance, initial coulombic efficiency and safety performance of the battery can be further improved.

In any embodiment, the coating layer has a thickness of from 1 nm to 1 μm, optionally from 5 nm to 200 nm, and further optionally from 20 nm to 100 nm. Under the condition that the coating layer has appropriate thickness, the initial coulombic efficiency and cycle performance of the battery can be improved.

In any embodiment, the functional film layer further comprises a polymer ionic liquid.

In the functionalized separator of the present application, the functional film layer may further comprises a polymer ionic liquid. The polymer ionic liquid has positively and negatively charged groups in the structure thereof. The positively charged group can interact with the group that is reversibly bonded with lithium ions of the polymer coating layer, so that the polymer ionic liquid can physically cross-link with the polymer of the coating layer. As a result, the strength and electrolyte solution resistance of the functional film layer can be improved. The negatively charged group is beneficial to increase the transmitting rate of the positive charge of lithium ions and reduce the impedance and over-potential. As a result, by using the functionalized separator, the initial coulombic efficiency, cycle performance and safety performance of lithium metal batteries can further improved.

In any embodiment, the polymer ionic liquid comprises the structural units represented by formulae I and II:

(Formula I)

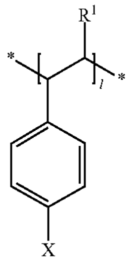

(Formula II)

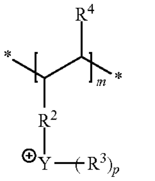

wherein,

X is an anion bearing negative charge, and optionally is $—COO^-$, $—SO_3^-$, $—SO_2N^-SO_2R^h$, $—RCOO^-$, $—RSO_3^-$, or $—RSO_2N^-SO_2R^f$;

R and $R^2$ are each independently C1-C10 hydrocarbylene group, or C1-C10 hydrocarbylene group containing one or more of F, Cl, Br, I, N, O, S, Si, B, and P;

$R^1$ and $R^4$ are each independently H, F, Cl, Br, I, —CN, C1-C10 hydrocarbon group, or C1-C10 hydrocarbon groups containing one or more of F, Cl, Br, I, N, O, S, Si, B, and P;

$R^3$, $R^h$, and $R^f$ are each independently F, Cl, Br, I, —CN, C1-C10 hydrocarbon group, or C1-C10 hydrocarbon group containing one or more of F, Cl, Br, I, N, O, S, Si, B, and P;

Y is N or P, and p is 3; or, Y is S, and p is 2;

l and m are identical or different positive integers.

Optionally, $1 \leq l \leq 2500$, $1 \leq m \leq 2500$.

Optionally, $l:m=1:(0.5\text{-}1.5)$.

Further optionally, the polymer ionic liquid may further comprise a structural unit represented by formula III:

(Formula III)

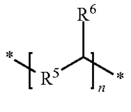

wherein, $R^5$ is C1-C10 alkylene group or C1-C10 alkylene group containing one or more of F, Cl, Br, I, N, O, S, Si, B, and P, and optionally is $—(CH_2)_t—$ or $—(CH_2)_q—O—(CH_2)_r—$, wherein t is from 1 to 8, q is from 0 to 4, r is from 0 to 4, and q and r are not 0 at the same time;

$R^6$ is H, F, Cl, Br, I, —CN, C1-C10 hydrocarbon group, or C1-C10 hydrocarbon group containing one or more of F, Cl, Br, I, N, O, S, Si, B and P, and optionally is H, —CN, $—CH_3$, $—C_2H_5$, linear $—C_3H_7$, linear $—C_4H_9$, or $—(CH_2CH_2O)_uCH_3$ wherein u is from 1 to 8;

n is a positive integer.

Optionally, $1 \leq n \leq 2500$.

Optionally, $l:m:n=1:(0.5\text{-}1.5):(0\text{-}1.5)$.

The functionalized separator comprises suitable polymer ionic liquid, and thus can further improve the initial coulombic efficiency, cycle performance and safety performance of lithium metal batteries.

In any embodiment, polymer ionic liquid has a number average molecular weight of from 40,000 to 1,000,000.

In any embodiment, in the functional film layer, the mass ratio of the inorganic particles to the polymer ionic liquid is (80-99):(1-20), and optionally is (90-98):(2-10). By using this functional film, the cycle performance and initial coulombic efficiency of the battery may be further improved.

In any embodiment, the functional film layer has a thickness of from 0.1 μm to 20 μm, and optionally from 1 μm to 10 μm. Under the condition that the thickness of the functional film layer falls within an appropriate range, it is beneficial for the battery to simultaneously have high initial coulombic efficiency, cycle performance and safety performance.

In any embodiment, the substrate is a polymer substrate. The polymer substrate may have high strength and toughness at the same time, so that the functionalized separator has high strength and toughness. Therefore, it is beneficial to improve the cycle performance of the battery.

Optionally, the substrate has a thickness of from 5 μm to 25 μm.

A second aspect of the present application provides a method for preparing a functionalized separator, comprising the step of forming a functional film layer containing inorganic particles on at least one surface of a porous substrate, wherein the inorganic particles may reversibly react with metal lithium to form a lithium alloy.

A third aspect of the present application provides a lithium metal battery, comprising a positive electrode plate; a negative electrode plate comprising a lithium-based metal layer; a separator which is the functionalized separator according to the first aspect of the present application, wherein the functional film layer is arranged to contact with the lithium-based metal layer; and an electrolyte solution.

It should understand that, other than lithium metal batteries, the functionalized separator according to the present application can be used in other lithium ion lithium metal batteries, such as lithium ion lithium metal batteries having graphite anodes and lithium ion lithium metal batteries having silicon-based anodes. In these lithium metal batteries, the functional film layer of the functionalized separator film is arranged to close to or contact with the negative electrode film layer. During the charging of the lithium metal battery, the inorganic particles in the functionalized separator reversibly react with lithium ions to form a lithium alloy, so as to adjust and control the diffusion of lithium ions in the negative electrode. In addition, this is beneficial for uniform lithiation of the negative electrode, and thus may effectively inhibit the growth of lithium dendrites on the surface of the negative electrode.

A fourth aspect of the present application provides a device comprising the lithium metal battery according to the second aspect of the present application.

The device of the present application comprises the lithium metal battery, and thus can have effects identical or similar to those of the lithium metal battery.

DESCRIPTION OF THE DRAWINGS

In order to explain the technical solutions of the embodiments of the present application more clearly, the following will briefly introduce the drawings that need to be used in the embodiments of the present application. Those skilled in the art can obtain other drawings based on the drawings without incurring creative work.

DETAILED DESCRIPTION

Figure 1:
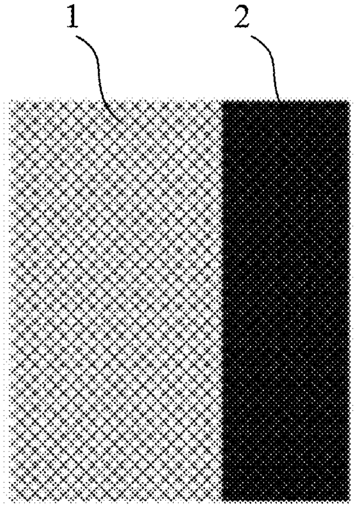
FIG. 1 is a schematic diagram of the structure of one functionalized separator according to one embodiment of the present application.
Figure 2:
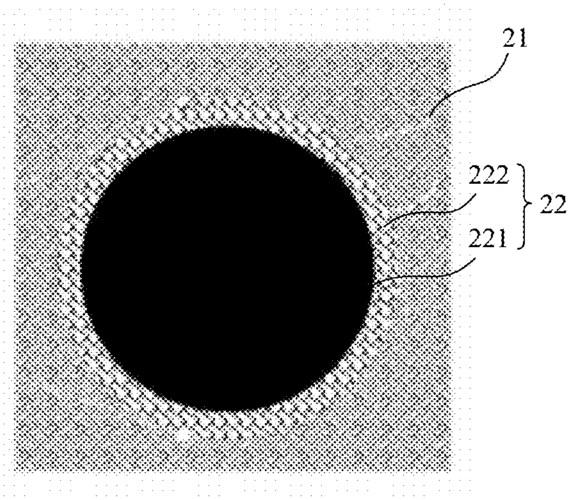
FIG. 2 is a partially magnified schematic diagram of the functional film layer as shown in FIG. 1.

In order to make the purpose of the invention, technical solutions, and beneficial technical effects according to the present application more clear, hereinbelow, the present application will be further described in detail with reference to examples. It should be understood that the examples described in the present description are only intended to explain the application, but not to limit the application.

For simplicity, only some numerical ranges are explicitly disclosed herein. Nevertheless, any lower limit may be combined with any upper limit to form an unspecified range. Moreover, any lower limit may be combined with other lower limits to form an unspecified range; likewise, any upper limit may be combined with any other upper limit to form an unspecified range. In addition, in spite of un-explicit specification, each point or single value between the end points of a range is included in the range. Therefore, each point or single value, as the lower limit or upper limit thereof, may be combined with any other point or single value, or with other lower limit or upper limit, to form an unspecified range.

In the description herein, it should be noted that, unless otherwise specified, "above" and "below" means including the number itself, and "more" in "one or more" means two or more.

The above-mentioned Summary in this application is not intended to describe each embodiment as disclosed or each implementation in this application. Hereinbelow, exemplary embodiments will be described more specifically. In many places throughout the application, guidance is provided by means of a series of embodiments, which can be applied in various combinations. In each instance, the enumeration is only a representative group and should not be interpreted as exhaustive.

Functionalized Separator

The embodiment according to the first aspect of the present application provides a functionalized separator. The functionalized separator comprises a porous substrate and a functional film layer laminated on at least one surface of the porous substrate, wherein, the functional film layer comprises inorganic particles which are able to reversibly react with metal lithium to form a lithium alloy.

When the functionalized separator is used in a lithium metal battery and the functional film layer contacts with lithium metal, the inorganic particles and the metal lithium, under the action of the electrolyte solution, will react reversibly to form a lithium alloy (which can be used as the negative electrode active material of the lithium ion battery) in situ; accordingly, the lithium composition on the surface of the metal lithium electrode changes. The forming of lithium alloys may effectively improve the surface property of lithium metal electrodes, adjust and control the deposition/dissolution behavior of lithium ions, and effectively inhibit the forming of dendrites.

Since the forming of lithium dendrites is effectively inhibited, what problem may be effectively solved is the repeated reorganization of SEI (solid electrolyte interphase) film on the surface of the metal lithium electrode and the continuous consumption of the electrolyte solution and active lithium owing to the growth of lithium dendrites in the existing lithium metal batteries. Moreover, the reversibility of the deposition/dissolution of the lithium ions in the lithium metal electrode is improved, and thus the capacity performance of the battery is improved and the cycle life of the battery is extended. By using the functionalized separator of the present application, what problem can be avoided is internal short circuit in the battery caused by the penetration of lithium dendrites through the separator, so that the safety performance of the battery is improved.

Therefore, by using the functionalized separator of the present application, the initial coulombic efficiency, cycle performance, and safety performance of lithium metal batteries are improved.

[Functional Film Layer]

Lithium can form intermetallic compounds with many materials. Moreover, the reaction to form lithium alloys is reversible, and thus may allow the lithiation and delithiation of lithium ions. In the functionalized separator of the embodiment according to the present application, the inorganic particles may be selected from materials that may form a lithium alloy with lithium. For example, the inorganic particles are one or more selected from silicon, silicon oxide compound $SiO_a$ wherein $0<a<2$ and for example $0.9 \leq a \leq 1.2$, magnesium, aluminum, zinc, indium, antimony, silver, gold, germanium, and tin.

In some embodiments, the inorganic particle have a volume average particle size $D_v50$ of from 10 nm to 20 μm. Optionally $D_v50$ is from 50 nm to 10 μm. Further optionally, $D_v50$ is from 200 nm to 2 μm. Under the condition that the inorganic particles have an appropriate particle size, the inorganic particles, after alloying with lithium, will have higher structural stability, and are not prone to cracking or breaking during the battery cycle, so that the cycle performance of the battery is improved. In addition, under the condition that the inorganic particles have an appropriate particle size, the migration path for lithium ions in the alloying inorganic particles becomes short, so that the ionic conductivity of the functional film layer is improved. As a result, the capacity and cycle performance of the battery are improved.

In some optional embodiments, at least part of the surface of the inorganic particles may also be coated with a polymer coating layer. The polymer coating layer may protect the lithium alloy, inhibit the volume change of the lithium alloy during the charging and discharging of the battery, and prevent the structural damage of the lithium alloy owing to the larger volume expansion effect. The polymer coating lay may also reduce the side reaction between the interface of the metal lithium and the electrolyte solution, reduce the battery impedance, and reduce the gas generation of battery. Therefore, the functional film layer is helpful to improve the cycle performance of the battery.

Generally, the polymer coating layer has good bonding properties, and can achieve a firm bonding between the functional film layer and the porous substrate. Thus, a binder may be used or not in the functional film layer according to requirements.

The polymer coating layer covering the surface of the inorganic particles may be, but are not limited to, one or more selected from polyvinylidene fluoride (PVDF), polyacrylic acid (PAA), polyaniline, polyolefin, and polyamide.

In some optional embodiments, the polymer coating layer comprises a group that can reversibly bond with lithium ions. The group reacts in situ with the lithium alloy (one example is ion exchanging; and another example is that the chemical bonds in the group (such as S—S bond in polysulfide group) may break to bind with lithium ions and may re-bind after delithiation) to form a reversible bonding between the group and lithium ions. As a result, the bonding tightness between the coating layer and the inorganic particles is improved, so that the coating layer may more effectively inhibit the volume change of the lithium alloy during the charging and discharging of the battery. Owing to the protecting of the coating layer, the inorganic particles may better achieve the above-mentioned effects. As a result, the lithium dendrites are better inhibited and the increase of the interface impedance of the lithium metal electrode is inhibited too. Moreover, the chemical bond formed in situ between the group of the coating layer and the lithium ion may be the channel for transmitting lithium ions, which can promote the transmitting of lithium ions and thus improve the dynamic performance of the lithium alloy electrode. By using the functionalized separator, the initial coulombic efficiency, the cycle performance and safety performance of lithium metal batteries are further improved.

In the polymer coating layer of the functional film layer, the group which is able to reversibly bond with lithium ions include, for example, one or more of an acid radical group, an amino group ($—NH_2$), an imino group (—NH), a sulfhydryl group (—SH; also known as mercapto group), and a polysulfide group ($—S_b—$, b≥2), but are not limited thereto. Optionally, the group is an acid radical. The acid radical may in situ react with the lithium alloy more effectively, so that the coating layer and the surface of the lithium alloyed inorganic particles have stronger interaction, and the volume change of the lithium alloy is be further reduced. The organic acid lithium formed in situ from the organic acid group and the lithium alloy can better promote the migration of lithium ions, and improve the lithium ion conductivity of the functional film layer.

For example, the acid radical group may comprise one or more of carboxylic acid group (—COOH), sulfonic acid group ($—SO_3H$), sulfinic acid group ($—SO_2H$), and phosphoric acid group ($—H_2PO_4$). Optionally, the acid radical group comprises one or more of carboxylic acid group and sulfonic acid group. Further optionally, the acid group comprises carboxylic acid group.

In some embodiments, the polymer for the coating layer is a polyolefin. Optionally, the polymer is a polyolefin containing acid radical, i.e. polyolefin acid. Polyolefin acid has high bonding performance, and thus, after in situ reacting with lithium alloy, can more firmly coat on the surface of inorganic particles. As a result, the volume change of lithium alloy during charging and discharging of the battery can be better inhibited. Moreover, owing to the chemical bond formed between the acid functional group of the polyolefin acid, the conductivity of lithium ions by the functional film layer can be further improved.

In some embodiments, the polyolefin acid may comprise, but is not limited to, one or more of polyethylene containing an acid radical group, polypropylene containing an acid radical group, polyisobutylene containing an acid radical group, polynorbornene containing an acid radical group, polymethylpentene containing acid radical group, polyisoprene containing an acid radical group, poly(1,4-butadiene) containing an acid radical group, poly(1,2-butadiene)-styrene copolymer containing an acid radical group, polystyrene containing an acid radical group, poly(methylstyrene) containing an acid radical group, poly(α,β,β-trifluorostyrene) containing an acid radical group, and poly(pentafluorostyrene)-perfluoro-ionomer containing an acid radical group.

Optionally, the polyolefin acid may be one or more selected from one of polymethacrylic acid, polyacrylic acid, polystyrene sulfonic acid, polypropylene-polystyrene sulfonic acid, polyvinyl sulfonic acid, polypropylene sulfonic acid, and polystyrene phosphoric acid. Further optionally, the polyolefin acid may be one or more selected from of polyacrylic acid and polystyrene sulfonic acid.

In some embodiments, the coating layer may have a thickness optionally of from 1 nm to 1 μm, also optionally of from 5 nm to 200 nm, and further optionally of from 20 nm to 100 nm. The thickness of the coating layer is suitable for inhibit the volume change of the lithium alloy, and at the same time, can allow the functional film layer to have higher conductivity for lithium ions. As a result, the initial coulombic efficiency and cycle performance of the battery can be improved.

In some optional embodiments, the functional film layer may further comprises a polymer ionic liquid. The group that is reversibly bonded with lithium ions in the polymer coating have electronegativity, and the polymer ionic liquid comprises positively charged group. The group having electronegativity in the polymer coating layer and the positively charged group in the polymer ionic liquid can interact with each other, so that the polymer ionic liquid and the polymer coating may physically cross-link. This is beneficial to render the functional film layer have improved strength and resistance to electrolyte solution of the, and thus can better achieve the above-mentioned effect. In addition, the polymer ionic liquid also comprises negatively charged groups, which can increase the rate for transmitting lithium ions, and reduce impedance and overpotential. Therefore, such functionalized separator can further improve the initial coulombic efficiency, cycle performance and safety performance of lithium metal batteries.

In any embodiment, the polymer ionic liquid may be a compound comprising the structural units represented by formulae I and II:

(Formula I)

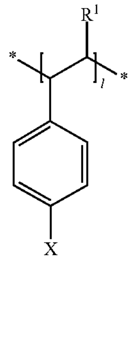

-continued (Formula II)

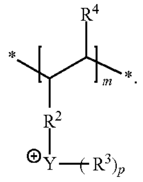

In Formula I, X is a negatively charged anion. Optionally, X is —$COO^-$, —$SO_3^-$, —$SO^2N^-SO^2R^h$, —$RCOO^-$, —$RSO_3^-$, or —$RSO_2N^-SO_2R^f$. R is C1-C10 hydrocarbylene group, or C1-C10 hydrocarbylene group containing one or more of fluorine (F), chlorine (Cl), bromine (Br), iodine (I), nitrogen (N), oxygen (O), sulfur (S), silicon (Si), Boron (B) and phosphorus (P) one or more. $R_h$ is F, Cl, Br, I, cyano (—CN), C1-C10 hydrocarbon group, or C1-C10 hydrocarbon group containing one or more of F, Cl, Br, I, N, O, S, Si, B and P $R^f$ is F, Cl, Br, I, cyano (—CN), C1-C10 hydrocarbon group, or C1-C10 hydrocarbon group containing one or more of F, Cl, Br, I, N, O, S, Si, B and P.

$R^1$ is H, F, Cl, Br, I, —CN, C1-C10 hydrocarbon group, or C1-C10 hydrocarbon group containing one or more of F, Cl, Br, I, N, O, S, Si, B and P. Optionally, $R^1$ is H, —$CH_3$, —$C_2H_5$, straight chain —$C_3H_7$, straight chain —$C_4H_9$, or —$(CH_2CH_2O)_vCH_3$ wherein v is from 1 to 8.

l is a positive integer. Optionally, $1 \leq l \leq 2500$.

In Formula II, Y is nitrogen (N), sulfur (S) or phosphorus (P), and p is 2 or 3. The value of p relates to the valence of Y atom. Optionally, Y is N or P, and p is 3. Optionally, Y is S and p is 2.

$R^2$ is C1-C10 hydrocarbylene group, or C1-C10 hydrocarbylene group containing one or more of F, Cl, Br, I, N, O, S, Si, B, and P. Optionally, $R^2$ is C1-C4 alkylene group, or a C1-C4 alkylene group containing one or more of F, Cl, Br, I, N, O, S, Si, B, and P.

$R^3$ is F, Cl, Br, I, —CN, C1-C10 hydrocarbon group, or C1-C10 hydrocarbon group containing one or more of F, Cl, Br, I, N, O, S, Si, B and P. Optionally, $R^3$ is —$CH_3$, —$C_2H_5$, linear —$C_3H_7$, linear —$C_4H_9$, or —$(CH_2CH_2O)_sCH_3$, and s is from 1 to 8. It can be understood that the p $R^3$ connected to Y may be identical or different.

$R^4$ is H, F, Cl, Br, I, —CN, C1-C10 hydrocarbon group, or C1-C10 hydrocarbon group containing one or more of F, Cl, Br, I, N, O, S, Si, B and P. Optionally, $R^4$ is H, —$CH_3$, —$C_2H_5$, straight chain —$C_3H_7$, straight chain —$C_4H_9$, or —$(CH_2CH_2O)_vCH_3$ wherein v is from 1 to 8.

m is positive integer. Optionally, $1 \leq m \leq 2500$.

In the polymer ionic liquid, l and m are identical or different positive integers. Optionally, l:m=1:(0.5-1.5).

In some optional embodiments, the polymer ionic liquid comprises the structural units represented by Formulae I, II and III. Such polymer ionic liquid can render the functional film layer have improved toughness, so as to prevent the functionalized separator from breaking during processing electrode assembly and using battery. As a result, the functionalized separator can achieve the above-mentioned performance thereof more effectively.

(Formula III)

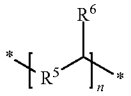

In formula III, $R^5$ is C1-C10 alkylene group or C1-C10 alkylene group containing one or more of F, Cl, Br, I, N, O, S, Si, B, and P. Optionally, $R^5$ is —$(CH_2)_t$— or —$(CH_2)_q$—O—$(CH_2)_r$—, wherein t is from 1 to 8, q is from 0 to 4, r is from 0 to 4, and q and r are not 0 at the same time.

$R^6$ is H, F, Cl, Br, I, —CN, C1-C10 hydrocarbon group, or C1-C10 hydrocarbon group containing one or more of F, Cl, Br, I, N, O, S, Si, B and P. Optionally, $R^6$ is H, —CN, —$CH_3$, —$C_2H_5$, linear —$C_3H_7$, linear —$C_4H_9$, or —$(CH_2CH_2O)_uCH_3$ wherein u is from 1 to 8.

n is a positive integer. Optionally, $1 \leq n \leq 2500$.

In the polymer ionic liquid of some embodiments, optionally, l:m:n=1:(0.5-1.5):(0-1.5). Under the condition that such polymer ionic liquid is used, the functional film layer may have higher strength and toughness, and simultaneously may have higher lithium ion conductivity.

Herein, the structure and the arrangement of the structural units of the polymer ionic liquid are not specially restricted. The polymer ionic liquid may have a structure of linear, branched or a cross-linked three-dimensional network. The polymer ionic liquid may be a random copolymer or a block copolymer etc.

The polymer ionic liquid may have a number average molecular weight of from 40,000 to 1,000,000.

In some embodiments, in the functional film layer, the mass ratio of the inorganic particles to the polymer ionic liquid is (80-99):(1-20), and optionally is (90-98):(2-10). In the functional film layer, the volume change of the lithium alloy is effectively inhibited; moreover, the functional film layer has high lithium ion migration performance.

In some embodiments, the thickness of the functional film layer may be from 0.1 μm to 20 μm, for example, from 1 μm to 10 μm. Under the condition that the functional film layer has proper thickness, it is helpful for inhibiting lithium dendrites on the lithium metal negative electrode, and at the same time the battery can simultaneously have high initial coulombic efficiency and cycle performance.

Herein, "C1-C10 hydrocarbon group" refers to the group formed by losing any one of hydrogen atoms from the molecule of a hydrocarbon compound having a carbon number of greater than or equal to 1 and less than or equal to 10. "C1-C10 hydrocarbon group containing one or more of F, Cl, Br, I, N, O, S, Si, B, and P" refers to the group formed by losing any one of hydrogen atoms from the molecule of one or more of hydrocarbon compound(s) containing one or more of F, Cl, Br, I, N, O, S, Si, B, and P and having a carbon number of greater than or equal to 1 and less than or equal to 10. "C1-C10 hydrocarbylene group" refers to the group formed by losing any two of hydrogen atoms from the molecule of a hydrocarbylene compound having a carbon number of greater than or equal to 1 and less than or equal to 10. "C1-C10 hydrocarbylene group containing one or more of F, Cl, Br, I, N, O, S, Si, B, and P" refers to the group formed by losing any two of hydrogen atoms from the molecule of one or more of hydrocarbylene compound(s) containing one or more of F, Cl, Br, I, N, O, S, Si, B, and P and having a carbon number of greater than or equal to 1 and less than or equal to 10.

Hydrocarbon compound may be a saturated hydrocarbon or an unsaturated hydrocarbon, including but not limited to, alkanes, cycloalkanes, alkenes, alkynes, and aromatic hydrocarbons. Said hydrocarbon compound may have a linear or branched structure.

[Substrate]

In the functionalized separator of the embodiment according to the present application, the type of substrate is not specifically limited. Any well-known porous film having good chemical and mechanical stability can be used. The substrate includes, but is not limited to, one or more selected from ceramic substrates and polymer substrates. For example, the substrate includes, but is not limited to, one or more of glass fiber, non-woven fabric, polyethylene, polypropylene, and polyvinylidene fluoride.

The substrate may be a single-layer film or a multilayer composite film. In case that the substrate is a multilayer composite film, the materials of each layer may be identical or different.

In some embodiments, the substrate may have a thickness of from 5 μm to 25 μm, for example, from 8 μm to 15 μm, such as 10 μm.

[Preparation Method]

The present application also provides a method for preparing a functionalized separator, comprising the steps of providing a porous substrate, and forming a functional film layer containing inorganic particles on at least one surface of a porous substrate, wherein the inorganic particles may reversibly react with metal lithium to form a lithium alloy. According to this method, there can be obtained a functionalized separator comprising inorganic particles and a polymer coating layer applying at least part of the surface of the inorganic particles.

Various methods can be used to form a functional film layer containing inorganic particles on the surface of the substrate, such as vapor deposition, electroplating, electroless plating, coating, and the like. For example, the coating method is used to bind the inorganic particles on the surface of the substrate via a binder. The binder may be, but is not limited to, one or more selected from polyvinylidene fluoride (PVDF), polytetrafluoroethylene (PTFE), polyacrylic acid (PAA), polyvinyl alcohol (PVA), sodium carboxymethyl cellulose (CMC), sodium alginate (SA), polymethacrylic acid (PMAA), and carboxymethyl chitosan (CMCS).

According to a specific embodiment, the method for preparing the functionalized separator of the present application comprised the following steps:

S10, providing a solution comprising a polymer.

S20: dispersing inorganic particles into the solution comprising a polymer, to obtain a mixed slurry.

S30, drying the mixed slurry, to obtain a solid powder.

S40: dispersing the solid powder into a solvent, to obtain a coating slurry.

S50, applying the coating slurry on the surface of the porous substrate, after drying, a functionalized separator is obtained.

In step S10, the polymer may be, but is not limited to, any one or more selected from those as described herein. Solvent is not specially restricted in terms of type, and may include, but is not limited to, one or more of water, N-Methyl pyrrolidone (abbreviated as NMP), dimethylbenzene (abbreviated as DMB), methylbenzene (abbreviated as MB), and dimethylformamide (N, N-Dimethylformamide, abbreviated as DMF).

In step S10, in the solution comprising the polymer, the polymer may have a mass concentration of from 0.1% to 10%, and optionally from 1% to 5%.

In step S20, the inorganic particles may be, but are not limited to, any one or more selected from those as described herein. The mass ratio of inorganic particles to polymer may be from 10 to 300, optionally from 20 to 200, and optionally from 50 to 100. Under the condition that mass ratio of the inorganic particles to the polymer has proper value, it is helpful to make the surface of the inorganic particles the polymer uniformly coated with the polymer, and to make the coating layer have proper thickness.

In step S20, the inorganic particles are dispersed in the solution comprising polymer and are subjected to stir, to obtain a uniformly mixed slurry. The stirring may be mechanical or ultrasonic stirring.

In step S30, the drying of the mixed slurry may conducted by methods and equipment well-known in the art, such as vacuum drying, airflow drying, spray drying, and the like. Drying can be performed under an inert protective atmosphere, which may be, but is not limited to, one or more selected from nitrogen, argon, and helium.

As an example, S30 may be performed by a spray dryer. By spray drying, the prepared materials may have more uniform coating and less agglomeration; in addition, preparation efficiency is higher.

In step S30, the drying temperature may be from 80° C. to 300° C., for example, from 110° C. to 250° C. The heating rate may be from 1° C./min to 10° C./min, for example, from 1° C./min to 5° C./min.

In step S40, the solvent may be, but is not limited to, on or more selected from water, N-methyl pyrrolidone (abbreviated as NMP), dimethylbenzene (abbreviated as DMB), methylbenzene (abbreviated as MB), and dimethylbenzene (N, N-Dimethylformamide, abbreviated as DMF).

The coating slurry may have a solid content of from 20% to 70%, such as from 30% to 50%.

In step S40, a polymer ionic liquid is optionally added. The polymer ionic liquid may be, but is not limited to, any one or more selected from those as described herein.

The polymer ionic liquid may be prepared by a preparation method well-known in the art. For example, the monomers of the polymer ionic liquid are added to a solvent, and the monomers undergo cross-linking polymerization initiated by heat and/or light, as such, the polymer ionic liquid is obtained.

In step S50, the coating slurry may be uniformly applied on the surface of the porous substrate by equipment and methods well-known in the art. For example, by microgravure coating, more uniform coating may be achieved.

In step S50, the temperature for drying the wet coating film may be from 60° C. to 120° C., such as from 70° C. to 100° C. Drying can be performed under an inert protective atmosphere, which may be, but is not limited to, one or more selected from nitrogen, argon, and helium.

[Structure of Functionalized Separator]

As an example, referring to FIG. 1, the functionalized separator comprises a porous substrate 1 and a functional film layer 2 laminated on the surface of the porous substrate. The functional film layer 2 comprises polymer ionic liquid 21 and composite particles 22. The composite particles 22 comprises inorganic particles 221 and polymer coating layer 222 covering the entire surface of the inorganic particles 221.

It should be noted that the above-mentioned structure only represents the functionalized separator according to one embodiment of the present application, but should not be understood as a restriction to the structure of the functionalized separator of the present application.

Lithium Metal Battery

The embodiment of the present application also provides a lithium metal battery. The lithium metal battery comprises a positive electrode plate, a negative electrode plate, a separator, and an electrolyte solution.

In a lithium metal battery, the negative electrode plate comprises a negative electrode current collector and a lithium-based metal layer laminated on at least one surface of the negative electrode current collector. The lithium-based metal layer may be selected from a lithium alloy layer or a metal lithium layer.

The separator uses any one of the functionalized separators according to the first aspect of the present application, and the functional film layer is arranged to contact with the lithium-based metal layer.

After the electrolyte solution is injected into the battery, the inorganic particles and metal lithium, under the action of the electrolyte solution, will react reversibly to form a lithium alloy in situ; accordingly, the lithium composition on the surface of the metal lithium electrode changes. The forming of lithium alloys may adjust and control the deposition/dissolution behavior of lithium ions, may effectively inhibit the growth of dendrites on lithium metal electrodes, and may be helpful to improve the reversibility of the deposition/dissolution of lithium ions on lithium metal electrodes. Therefore, the lithium metal batteries of the present application can simultaneously have higher initial coulombic efficiency, cycle performance, and safety performance.

In the lithium metal battery, the negative electrode current collector may adopt a material having good electrical conductivity and mechanical strength, such as copper foil.

The negative electrode plate may be prepared according to methods conventionally used in the art. For example, the negative electrode plate may be obtained by attaching lithium-based metal sheet to the surface of a copper foil. The attaching may be conducted by roller pressing, but is not limited thereto.

In the lithium metal battery, the positive electrode plate comprises a positive electrode current collector and a positive electrode film layer laminated on at least one surface of the positive electrode current collector.

The positive electrode current collector may adopt a material having good electrical conductivity and mechanical strength, such as aluminum foil.

In the positive electrode film layer, the specific types of positive electrode active materials are not specifically limited, and what may be used are the well-known materials that can be used as positive electrode active materials of lithium metal batteries. Those skilled in the art may select the positive electrode active materials according to actual requirements. The positive electrode active material may include, but is not limited to, one or more selected from lithium transition metal oxides and the modified materials thereof, wherein the modified materials comprise one of coated modified materials, doped modified materials, and coated and doped modified materials. In the lithium transition metal oxide, the transition metal may be one or more of Mn, Fe, Ni, Co, Cr, Ti, Zn, V, Al, Zr, Ce, and Mg. As an example, the positive electrode active material may include, but is not limited to, one or more selected from lithium cobalt oxide, lithium nickel oxide, lithium manganese oxide, lithium nickel manganese oxide, lithium nickel cobalt manganese oxide, lithium nickel cobalt aluminum oxide, lithium-containing phosphate having olivine structure, and the modified materials thereof.

The positive electrode film layer may also include a binder and/or a conductive agent. The types of the binder and the conductive agent are not specifically limited, and those skilled in the art can make selections according to actual requirements. As an example, the binder used for the positive electrode film layer may include, but is not limited to, one or more selected from polyvinylidene fluoride (PVDF), polytetrafluoroethylene (PTFE), polyacrylic acid (PAA), polyvinyl alcohol (PVA), carboxymethyl cellulose sodium (CMC), sodium alginate (SA), polymethacrylic acid (PMAA), and carboxymethyl chitosan (CMCS). The conductive agent used for the positive electrode film layer may include, but is not limited to, one or more selected from graphite, superconducting carbon, acetylene black, carbon black, Ketjen black, carbon dots, carbon nanotubes, graphene, and carbon nanofibers.

The positive electrode plate may be prepared according to methods conventional in the art. For example, the positive electrode active material, optional conductive agent and binder are dispersed in a solvent (such as N-methylpyrrolidone, abbreviated as s NMP), to form a uniform positive electrode slurry, and the positive electrode slurry is applied on the positive electrode current collector, after process such as drying and cold pressing etc., a positive electrode plate is obtained.

An electrode assembly may be made from the positive electrode plate, the separator and the negative electrode plate by a stacking or a winding process, wherein the separator is arranged between the positive electrode plate and the negative electrode plate to separate them.

In lithium metal batteries, the electrolyte solution is not specifically limited in terms of type, and may be selected according to requirements. The electrolyte solution comprises an electrolyte salt and a solvent.

The electrolyte salt may include, but is not limited to, one or more selected from $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium difluorosulfimide), LiTFSI (lithium bistrifluoromethanesulfonimide), LiTFS (lithium trifluoromethanesulfonate), LiDFOB (lithium difluorooxalate), LiBOB (lithium bisoxalate), $LiPO_2F_2$ (lithium difluorophosphate), LiDFOP (lithium difluorobisoxalate phosphate), and LiTFOP (lithium tetrafluorooxalate phosphate).

The solvent for electrolyte solution may include, but is not limited to, one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS), and diethyl sulfone (ESE).

The electrolyte solution may optionally comprises additives. The type of additives is not specifically limited, and can be selected according to requirements. As an example, the additives may include, but are not limited to, one or more selected from vinylene carbonate (VC), vinyl ethylene carbonate (VEC), fluoroethylene carbonate (FEC), succinonitrile (SN), adiponitrile (ADN), 1,3-propene sultone (PST), tris(trimethylsilyl) phosphate (TMSP), and tris(trimethylsilyl) borate (TMSB).

The lithium metal battery also includes an outer package for encapsulating the electrode assembly and electrolyte (not shown).

In some embodiments, the outer package of the lithium metal battery may be a hard case, such as a hard plastic case, an aluminum case, a steel case, etc. The outer package of the lithium metal battery may also be a soft package, such as a bag soft package. The soft package may be aluminum-plastic film package or plastic film package, wherein the plastic film package may include one or more of polypropylene (PP), polybutylene terephthalate (PBT), polybutylene succinate (PBS), etc.

The lithium metal battery may be prepared by methods well-known in the art. As an example, the electrode assembly is obtained by stacking a positive electrode plate, a separator and a negative electrode plate are stacked in order, wherein the separator is arranged between the positive electrode plate and the negative electrode plate to isolate them, alternatively, the electrode assembly may be obtained by winding; and the electrode assembly is placed in an outer package case, then a electrolyte solution is injected, after sealing, a lithium metal battery is obtained.

Figure 3:
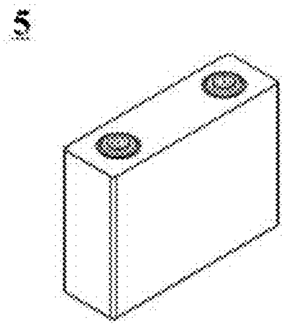
FIG. 3 is a schematic diagram of the structure of the lithium metal battery according to one embodiment.

The shape of the lithium metal battery is not specifically limited in the present application, and may be cylindrical, square, or other arbitrary shape. FIG. 3 shows a lithium metal battery 5 having a square structure as an example.

Figure 4:
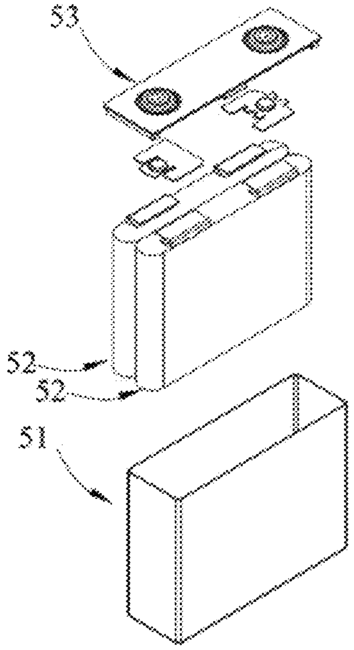
FIG. 4 is an exploded view of FIG. 3.

Optionally, referring to FIG. 4, the outer package may include a shell 51 and a cover plate 53. The shell 51 may include a bottom plate and side plates connected to the bottom plate, wherein the bottom plate and the side plates enclose to form a receiving cavity. The shell 51 has an opening communicated with the receiving cavity, and the cover plate 53 can cover the opening to close the receiving cavity. The electrode assembly 52 is packaged in the receiving cavity.

The lithium metal battery 5 may include one or more electrode assembly 52, according to requirements.

In some embodiments, the lithium metal battery may be assembled into a battery module. The battery module may include one or more lithium metal battery, according to requirements.

Figure 5:
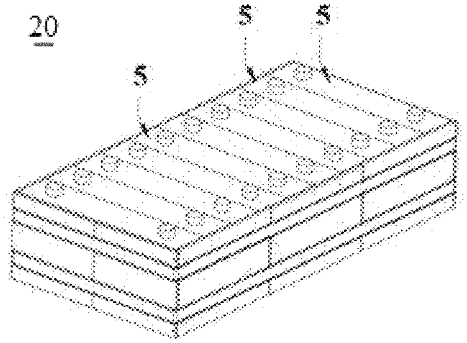
FIG. 5 is a schematic diagram of the battery module according to one embodiment.

FIG. 5 shows a battery module 20 as an example. Referring to FIG. 5, in the battery module 20, a plurality of lithium metal batteries 5 may be arranged sequentially in a length direction of the battery module 5. Of course, they may also be arranged in any other way. Further, the plurality of lithium metal batteries 5 may be fixed by fasteners.

Optionally, the battery module 5 may further include a housing having a receiving space, and the plurality of lithium metal batteries 5 are received in the receiving space.

In some embodiments, the above-mentioned battery module may also be assembled into a battery pack, and the number of battery modules included in the battery pack may be adjusted according to the application and capacity of the battery pack.

Figure 6:
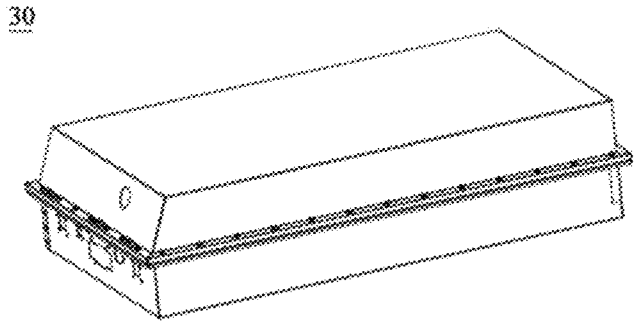
FIG. 6 is a schematic diagram of the battery pack according to one embodiment.
Figure 7:
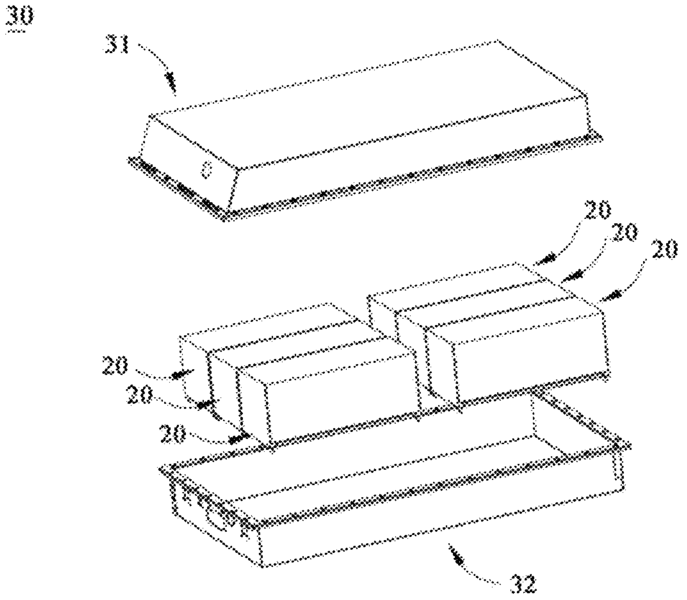
FIG. 7 is an exploded view of FIG. 6.

FIGS. 6 and 7 show a battery pack 30 as an example. Referring to FIGS. 6 and 7, the battery pack 30 may include a battery box and a plurality of battery modules 20 disposed in the battery box. The battery box includes an upper box body 31 and a lower box body 32. The upper box body 31 may cover the lower box body 32 to form a closed space for receiving the battery modules 20. The plurality of battery modules 20 may be arranged in the battery box in any manner.

Device

The present application also provides a device comprising the lithium metal battery of the present application. The lithium metal battery may be used as a power supply of the device, and may also be used as an energy storage unit of the device. The devices are, for example, new energy vehicles, electronic devices, power tools, power storage facilities, etc. The device may be, but is not limited to, a mobile device (e.g., a mobile phone, a notebook computer, etc.), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc.

The lithium metal battery, battery module, or the battery pack may be used in the device according usage requirements.

Figure 8:
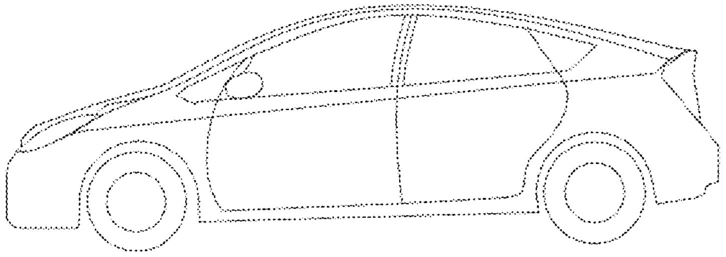
FIG. 8 is a schematic diagram of the device wherein a lithium metal battery is used as a power source according to one embodiment.

FIG. 8 shows a device as an example. The device is a pure electric vehicle, a hybrid electric vehicle, or a plug-in hybrid electric vehicle etc. In order to meet the requirements of the devices for high power and high energy density of the lithium metal battery, a battery pack or a battery module may be used.

EXAMPLES

The following examples more specifically describe the content disclosed in the present application, and these examples are only used for explanatory description, because various modifications and changes within the scope of the present disclosure are obvious to those skilled in the art. Unless otherwise stated, all parts, percentages, and ratios described in the following examples are based on weight; all reagents used in the examples are commercially available or synthesized according to conventional methods and can be directly used without further treatment; and all instruments used in the examples are commercially available.

Example 1

Preparation of Functionalized Separator 300 g of silicon oxide compound SiO (having a $D_v50$ of 1 μm) was ultrasonically dispersed in 200 g of polyacrylic acid aqueous solution with a mass concentration being 1.5%, under stirring for 5 hours to achieve thorough mixing, after drying with a spray dryer at a drying temperature of 130° C., the composite particles were obtained. The composite particles comprise SiO particles and polyacrylic acid coating layer applying on the surface of the SiO particles, wherein the coating layer had a thickness of 10 nm.

Monomers lithium (p-vinylbenzenesulfonyl)(fluorosulfonyl)imide and ammonium (butene)(trimethyl) iodide were mixed in acetone at a molar ratio of 1:1, and 4 wt % of p-phenylene diene and 2 wt % of 2-ethoxy-1,2-diphenylethanone were added. After ultrasonic dissolution, cross-linking polymerization were initiated by UV light, to obtain polymer ionic liquid IV. The polymer ionic liquid IV had a number average molecular weight of about 100,000 and comprised the structural unit represented by Formula IV, wherein/and m are about 240 respectively.

(Formula IV)

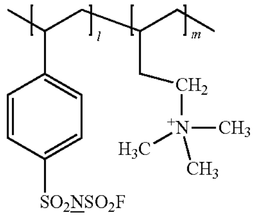

The composite particles and polymer ionic liquid were added into the solvent NMP in a mass ratio of 95:5, after being mixed uniformly, a coating slurry was obtained. The coating slurry had a solid content of 40 wt %.

The slurry was uniformly applied on one surface of the porous polyethylene substrate having a thickness of 10 μm by micro-gravure coating, to obtain a wet film. After drying the wet film in an oven at 70° C., a functionalized separator was obtained. The functionalized separator had a thickness of 5 μm.

Preparation of Positive Electrode Plate $LiNi_{0.8}Co_{0.1}Mn_{0.1}O_2$ as positive electrode active material, acetylene black as conductive agent, and PVDF as binder were mixed in a mass ratio of 96:2:2, and NMP as solvent was added, then they were stirred until the system was uniform, to obtain a positive electrode slurry; the positive electrode slurry was uniformly applied on a 12 μm thick of aluminum foil as positive electrode current collector, and then was baked at 120° C. for 1 hour, after compacting and slitting, a positive electrode plate was obtained.

Preparation of Negative Electrode Plate

A 25 μm thick of lithium metal foil was attached to the surface of an 8 μm thick of copper foil by rolling, after slicing, a negative electrode plate was obtained.

Preparation of Electrolyte Solution

In the drying room, ethylene carbonate (EC), propylene carbonate (PC), and diethyl carbonate (DEC) were mixed at a weight ratio of EC:PC:DEC=1:1:1, to obtain a mixed solvent, and then $LiPF_6$ was uniformly dissolved in the mixed solvent to obtain a non-aqueous electrolyte solution with the concentration of $LiPF_6$ being 1 mol/L.

Preparation of Lithium Metal Battery

The positive electrode plate, the separator, and the negative electrode plate were stacked in sequence to prepare an electrode assembly, wherein the functional film layer of the separator attached with the lithium-based metal layer of the negative electrode plate; then the electrode assembly was packed into an aluminum foil package; and then the electrolyte solution was injected; after encapsulating, a lithium metal battery having a capacity of 1 Ah was obtained.

Example 2

The lithium metal battery was prepared according to Example 1, except that in the composite particles, the inorganic particles had a particle size of 10 nm.

Example 3

The lithium metal battery was prepared according to Example 1, except that in the composite particles, the inorganic particles had a particle size of 200 nm.

Example 4

The lithium metal battery was prepared according to Example 1, except that in the composite particles, the inorganic particles had a particle size of 2 μm.

Example 5

The lithium metal battery was prepared according to Example 1, except that in the composite particles, inorganic particles had a particle size of 20 μm.

Example 6

The lithium metal battery was prepared according to Example 1, except that in the composite particles, the polyacrylic acid coating layer had a thickness of 1 nm.

Example 7

The lithium metal battery was prepared according to Example 1, except that in the composite particles, the polyacrylic acid coating layer had a thickness of 20 nm.

Example 8

The lithium metal battery was prepared according to Example 1, except that in the composite particles, the polyacrylic acid coating layer had a thickness of 100 nm.

Example 9

The lithium metal battery was prepared according to Example 1, except that in the composite particles, the polyacrylic acid coating layer had a thickness of 1 μm.

Example 10

The lithium metal battery was prepared according to Example 1, except that the functional film layer had a thickness of 1 μm.

Example 11

The lithium metal battery was prepared according to Example 1, except that the functional film layer had a thickness of 10 μm.

Example 12

The lithium metal battery was prepared according to Example 1, except that the functional film layer had a thickness of 20 μm.

Example 13

The lithium metal battery was prepared according to Example 1, except that the inorganic particles were elemental silicon.

Example 14

The lithium metal battery was prepared according to Example 1, except that the inorganic particles were aluminum.

Example 15

The lithium metal battery was prepared according to Example 1, except that the inorganic particles were tin.

Example 16

The lithium metal battery was prepared according to Example 1, except that polymer ionic liquid V comprising the structural unit represented by Formula V was used.

(Formula V)

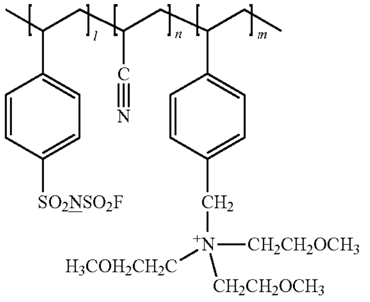

Preparation of polymer ionic liquid V: monomers lithium (p-vinylbenzenesulfonyl) (fluorosulfonyl)imide, (p-vinylbenzyl) (methoxyethyl) ammonium iodide, and acrylonitrile were mixed in acetone at a molar ratio of 1:1:1.2, and 4 wt % of p-phenylene diene and 2 wt % of 2-ethoxy-1,2-diphenylethanone were added. After ultrasonic dissolution, cross-linking polymerization were initiated by UV light, to obtain polymer ionic liquid V. The polymer ionic liquid V had a number average molecular weight of about 70,000, wherein l and n are about 110, and m is about 130.

Example 17

The lithium metal battery was prepared according to Example 1, except that polymer ionic liquid VI comprising the structural unit represented by Formula VI was used.

(Formula VI)

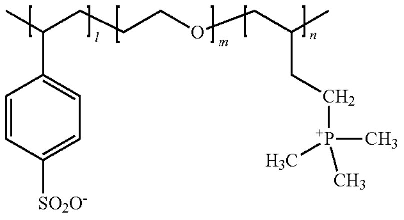

Preparation of polymer ionic liquid VI: monomers lithium p-vinylbenzene sulfonate, (butene)(trimethyl) phosphonium iodide, and ethylene oxide were mixed in acetone at a molar ratio of 1:1:1.2, and 4 wt % of p-phenylenediene and 2 wt % of 2-ethoxy-1,2-diphenylethanone were added. After ultrasonic dissolution, cross-linking polymerization were initiated by UV light, to obtain polymer ionic liquid VI. The polymer ionic liquid VI had a number average molecular weight of about 60,000, wherein l and n are about 130, and m is about 150.

Example 18

The lithium metal battery was prepared according to Example 1, except that the coating layer was a polystyrene sulfonic acid coating layer.

Example 19

The lithium metal battery was prepared according to Example 1, except that the inorganic particles were not been coated.

Example 20

The lithium metal battery was prepared according to Example 1, except that the polymer ionic liquid were not added, and the inorganic particles were not been coated but were adhered to the surface of the substrate via binder PVDF having a molecular weight of 100,000.

Example 21

The lithium metal battery was prepared according to Example 1, except that the polymer ionic liquid were not added.

Comparative Example 1

The lithium metal battery was prepared according to Example 1, except that the separator were not been processed.

Comparative Example 2

The lithium metal battery was prepared according to Example 1, except that the surface of the separator was only coated with polymer ionic liquid IV with the coating thickness being 5 μm.

Comparative Example 3

The lithium metal battery was prepared according to Example 1, except that the inorganic particles were $SiO_2$ and were not coated.

Tests (1) Tests of Initial Coulomb Efficiency and Cycle Performance

At 25° C., the lithium metal battery was charged to 4.25V at a constant current of 1.5 mA/cm$^2$, then were charged to 0.3 mA/cm$^2$ at a constant voltage of 4.25V, to obtain the specific charging capacity of the first cycle ($C_{c1}$); and then, the lithium metal battery was discharged to 3.0V at a constant current of 1.5 mA/cm$^2$, to obtain the specific discharging capacity of the first cycle ($C_{d1}$). The charging and discharging were repeated for n cycles, to obtain the specific discharging capacity after n cycles of the lithium metal battery, recorded as $C_{dn}$.

First Coulomb Efficiency=Specific discharging capacity of the first cycle ($C_{d1}$)/Charging specific capacity of the first cycle ($C_{c1}$)

Capacity retention rate=Specific discharging capacity after $n$ cycles ($C_{dn}$)/Specific discharging capacity of the first cycle ($C_{d1}$)

(2) Test for Lithium Dendrites on the Surface of the Negative Electrode Plate

The lithium metal battery that were at fully-charged state after the 100 cycles according to method described under item (1) was disassembled. The surface morphology of the lithium metal negative electrode plate was observed on an optical microscope, and the cross-sectional morphology of the lithium metal negative electrode plate was observed on an electronic microscope, the lithium deposition thickness was also observed to compare with theoretical deposition thickness. The formation of lithium dendrites was evaluated according to the following standards: "none"—the thickness increase ratio is less than 150%, which can be considered as no lithium dendrites; "slight"—the thickness increase ratio falls within 150%-200%; "medium"—the thickness increase ratio is greater than 200% and equal or less than 250%; and "severe"—the thickness increase rate is greater than 250%.

(3) Test for the Particle Size of the Inorganic Particles

Particle size distribution $D_{v50}$ were tested according to Laser Diffraction Method (Malvern Laser Particle Sizer 300).

and cycle efficiency decreased, and thus the battery capacity decreased and battery cycle life became short. Such result shows that, using the functionalized separator of the present application, the cycle performance of the battery could be effectively improved and the lithium dendrites could be effectively inhibited.

TABLE 1

Parameters and performances of the lithium metal batteries of Examples 1-21 and Comparative Examples 1-3.

| Nos. | Inorganic particles | | Coating layer | | Polymer ionic liquid | Thickness of functional film layer (μm) | Initial coulombic efficiency (%) | Capacity retention rate after 50 cycles (%) | Capacity retention rate after 200 cycles (%) | Lithium dendrites |
|---|---|---|---|---|---|---|---|---|---|---|
| | Type | $D_v50$ (μm) | Type | Thickness (nm) | | | | | | |
| Example 1 | SiO | 1 | PAA | 10 | IV | 5 | 95.3 | 99.5 | 93.8 | None |
| Example 2 | SiO | 0.01 | PAA | 10 | IV | 5 | 84.3 | 86.2 | 72.1 | None |
| Example 3 | SiO | 0.2 | PAA | 10 | IV | 5 | 90.3 | 90.0 | 80.9 | None |
| Example 4 | SiO | 2 | PAA | 10 | IV | 5 | 95.2 | 99.1 | 93.3 | None |
| Example 5 | SiO | 20 | PAA | 10 | IV | 5 | 86.3 | 91.1 | 81.3 | Slight |
| Example 6 | SiO | 1 | PAA | 1 | IV | 5 | 87.4 | 92.8 | 83.7 | None |
| Example 7 | SiO | 1 | PAA | 20 | IV | 5 | 93.2 | 92.2 | 89.7 | None |
| Example 8 | SiO | 1 | PAA | 100 | IV | 5 | 93.1 | 92.1 | 87.9 | None |
| Example 9 | SiO | 1 | PAA | 1000 | IV | 5 | 85.9 | 95.8 | 85.1 | None |
| Example 10 | SiO | 1 | PAA | 10 | IV | 1 | 96.5 | 96.2 | 87.2 | None |
| Example 11 | SiO | 1 | PAA | 10 | IV | 10 | 92.3 | 98.3 | 89.4 | None |
| Example 12 | SiO | 1 | PAA | 10 | IV | 20 | 84.3 | 90.7 | 79.3 | None |
| Example 13 | Si | 1 | PAA | 10 | IV | 5 | 96.2 | 99.4 | 94.2 | None |
| Example 14 | Al | 1 | PAA | 10 | IV | 5 | 95.8 | 99.7 | 94.1 | None |
| Example 15 | Sn | 1 | PAA | 10 | IV | 5 | 95.0 | 99.0 | 92.4 | None |
| Example 16 | SiO | 1 | PAA | 10 | V | 5 | 92.7 | 98.5 | 90.6 | None |
| Example 17 | SiO | 1 | PAA | 10 | VI | 5 | 91.9 | 98.2 | 90.1 | None |
| Example 18 | SiO | 1 | PSS | 10 | IV | 5 | 95.6 | 99.5 | 94.1 | None |
| Example 19 | SiO | 1 | / | / | IV | 5 | 85.2 | 91.8 | 80.3 | Slight |
| Example 20 | SiO | 1 | / | / | / | 5 | 84.2 | 90.3 | 74.4 | Medium |
| Example 21 | SiO | 1 | PAA | 10 | / | 5 | 90.5 | 95.7 | 89.7 | Slight |
| Comparative example 1 | / | / | / | / | / | / | 71.4 | 82.1 | 56.7 | Severe |
| Comparative example 2 | / | / | / | / | IV | 5 | 79.7 | 87.3 | 72.2 | Severe |
| Comparative example 3 | $SiO_2$ | 1 | / | / | IV | 5 | 75.3 | 87.5 | 73.5 | Medium |

In Table 1,
PAA means polyacrylic acid; and
PSS means polystyrene sulfonic acid.

In Table 1, PAA means polyacrylic acid; and PSS means polystyrene sulfonic acid.

By comparing Examples 1-21 with Comparative Examples 1-3, it can be seen that the initial coulombic efficiency and cycle capacity retention rate of the lithium metal battery were improved because of using the functionalized separator of the present application.

The battery was disassembled to observe the surface of the lithium metal negative electrode plate on an optical microscope. As to the lithium metal battery using the separator of the present application, the interface film formed on the surface of the lithium metal negative electrode plate was thinner and dense. In contrast, as to comparative example 1, the surface of the lithium metal negative electrode plate was covered with thicker, fluffy, brown deposit which contained a large amount of lithium dendrites. The large amount of lithium dendrites on the surface of the metal lithium negative electrode plate were the main reasons for the short circuit of the battery. Moreover, the lithium dendrites had large surface area and high activity, and thus were easy to react violently with the electrolyte solution. This would lead to repeated re-forming of the SEI film on the surface of the metal lithium, which consumed the electrolyte solution and active lithium. As a result, the initial coulombic efficiency From the results of Examples 1, 13 to 15 and Comparative Example 3, it can be seen that under the circumstances that inorganic particles are selected as SiO, Si, Al, Sn, etc. that can form alloy with lithium, the lithium composition on the surface of the lithium metal negative electrode could be changed. The forming of lithium alloy could adjust and control deposition/dissolution of lithium and inhibit the growth of dendrites on lithium metal electrode. Accordingly, it was beneficial to improve the reversibility of the deposition/dissolution of lithium, so that the battery exhibits good cycle performance. In contrast, under the circumstances that inactive inorganic particles such as $SiO_2$ were used, there would be sever dendrites on the lithium metal negative electrode of the battery, and thus the battery capacity decayed quickly.

From the results of Examples 1 to 5, it can be seen that the particle size of the inorganic particles had greater effect on the performance of the battery. When the particle size was small, there would be many pores in the coating layer. This caused great physical consumption of the electrolyte, and thus battery decay was accelerated. When the particle size was too large, the consistency of the coating layer was poor. Thus resulted in inconsistent effects of the coating layer on the surface of the lithium metal.

From the results of Examples 1, 6-10, 18 and e 19, it can be seen that the polymer coating layer and the thickness thereof affected the performance of the battery. Specifically, under the circumstances that there was no coating layer (Example 19) or the coating layer is thinner (Example 6), the capacity of the battery decayed faster, and the cycle life was low accordingly. This is because the polyacrylic acid coating layer could perform micro-reaction with the lithium alloy in situ after lithium was alloyed, so as to increase the active force in the lithium alloy. This was beneficial to inhibit the volume change of the lithium alloy during the charging and discharging of the battery. Moreover, the organic acid lithium structure formed by the in-situ chemical reaction could provide a channel for transmitting lithium ions, so as to promote the transmitting of lithium ions. Under the circumstance that the polymer coating layer had appropriate thickness, the initial coulombic efficiency and cycle performance of the battery could be improved.

From the results of Examples 1 and 10-12, it can be seen that, the functional film layer having too small thickness would not be advantageous to form stable alloyed layer. In contrast, the functional film layer having too big thickness would affect the transmitting of lithium ions. This would lead to gradually increased polarization during battery cycle, and thus lead to accelerated capacity decay. The functional film layer having appropriate thickness could effectively prevent the contact of electrolyte solution with lithium metal, reduce side reactions, and improve the cycle performance of the battery.

From the results of Examples 1, 16 to 18 and 20, it can be seen that, the type of polymer in the functional film layer also had significant effect. Under the circumstances that polymer ionic liquid had positive and negative charges, the positive charge could interact with the acid radical anion in the coating layer to form a winded chemical bond, which could improve the strength of the functional film. The negative charge could accelerate the transmitting of positive charge of lithium ions and thus reduce impedance and overpotential.

Accordingly, under the circumstance that polymer ionic liquid were added into the functional film layer, the problem of generating lithium dendrites in lithium metal batteries could be effectively addressed, meanwhile, the initial coulombic efficiency and cycle performance of the battery could be improved more significantly.

Conclusively, using the functionalized separator of the present application, a protective layer similar to SEI film could be constructed on the surface of the lithium metal negative electrode. The protective layer could inhibit lithium dendrites on the lithium metal electrode and reduce the side reactions at the interface between the lithium metal and the electrolyte solution, and thus improve the performance of lithium metal batteries.

Described above are merely specific embodiments of the present application, but the protection scope of the present application is not limited to this. Those skilled in the art who are familiar with this art could readily conceive of various equivalent modifications or substitutions within the disclosed technical scope of the present application, and these modifications or substitutions shall fall within the protection scope of the present application. Therefore, the protection scope of the present application shall be subject to the protection scope of the claims.

What is claimed is:

1. A functionalized separator, comprising a porous substrate and a functional film layer provided on at least one surface of the porous substrate, wherein the functional film layer comprises inorganic particles which are able to reversibly react with metal lithium to form a lithium alloy and has a thickness of from 1 μm to 5 μm, and wherein the inorganic particles are SiO and have a volume average particle size Dv50 of from 1 μm to 2 μm, wherein at least part of surfaces of the inorganic particles is coated with a polymer coating layer, wherein the polymer coating layer comprises a group that is reversibly bonded with lithium ions, wherein the polymer coating layer has a thickness of from 5 nm to 10 nm, and wherein the coating layer comprises polyolefin acid containing an acid radical group, and the polyolefin acid comprises one or more of polyacrylic acid and polystyrene sulfonic acid, and wherein the functional film layer further comprises a polymer ionic liquid, wherein the polymer ionic liquid comprises the structural units represented by Formula IV:

(Formula IV)

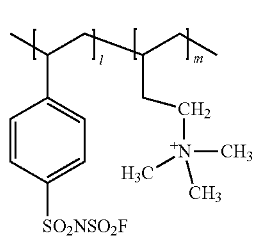

wherein l and m are 240.

2. The functionalized separator according to claim 1, wherein the group that is reversibly bonded with lithium ions comprises one or more of the acid radical group, an amino group, an imino group, a sulfhydryl group, and a polysulfide group ($—S_b—$, b≥2), and further optionally, the acid radical group comprises one or more of carboxylic acid group, sulfonic acid group, sulfinic acid group, and phosphoric acid group.

3. The functionalized separator according to claim 1, wherein the polymer ionic liquid further comprises a structural unit represented by formula III:

(Formula III)

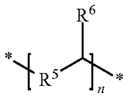

wherein, $R^5$ is C1-C10 alkylene group or C1-C10 alkylene group containing one or more of F, Cl, Br, I, N, O, S, Si, B, and P, and optionally is $—(CH_2)_t—$ or $—(CH_2)_q—O—(CH_2)_r—$, wherein t is from 1 to 8, q is from 0 to 4, r is from 0 to 4, and q and r are not 0 at the same time;

$R^6$ is H, F, Cl, Br, I, —CN, C1-C10 hydrocarbon group, or C1-C10 hydrocarbon group containing one or more of F, Cl, Br, I, N, O, S, Si, B and P, and optionally is H, —CN, $—CH_3$, $—C_2H_5$, linear $—C_3H_7$, linear $—C_4H_9$, or $—(CH_2CH_2O)_uCH_3$ wherein u is from 1 to 8;

n is a positive integer; optionally, 1≤n≤2500.

4. The functionalized separator according to claim 1, wherein polymer ionic liquid has a number average molecular weight of from 40,000 to 1,000,000.

5. The functionalized separator according to claim 1, wherein, in the functional film layer, the mass ratio of the inorganic particles to the polymer ionic liquid is (80-99):(1-20).

6. The functionalized separator according to claim 1, wherein the substrate is a polymer substrate; and optionally, the substrate has a thickness of from 5 μm to 25 μm.

7. A lithium metal battery, comprising a positive electrode plate;

a negative electrode plate comprising a lithium-based metal layer;

a separator which is the functionalized separator according to claim 1, wherein the functional film layer is arranged to contact with the lithium-based metal layer; and an electrolyte solution.

8. A device comprising the lithium metal battery according to claim 7.

9. The functionalized separator according to claim 1, comprising a porous substrate and a functional film layer provided on at least one surface of the porous substrate, wherein the functional film layer comprises inorganic particles which are able to reversibly react with metal lithium to form a lithium alloy and has a thickness of 5 μm, and wherein the inorganic particles are SiO and have a volume average particle size Dv50 of from 1 μm to 2 μm, wherein at least part of surfaces of the inorganic particles is coated with a polymer coating layer, wherein the polymer coating layer comprises a group that is reversibly bonded with lithium ions, wherein the polymer coating layer has a thickness of 10 nm, and wherein the coating layer comprises polyolefin acid containing an acid radical group, and the polyolefin acid comprises one or more of polyacrylic acid and polystyrene sulfonic acid, and wherein the functional film layer further comprises a polymer ionic liquid, wherein the polymer ionic liquid comprises the structural units represented by Formula IV:

(Formula IV)

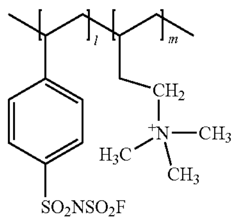

wherein l and m are 240.

* * * * *